(12) United States Patent
Slagt et al.

(10) Patent No.: US 10,301,197 B2
(45) Date of Patent: May 28, 2019

(54) METHOD OF PURIFYING WATER

(71) Applicants: Dow Global Technologies LLC, Midland, MI (US); Rohm and Haas Company, Collegeville, PA (US)

(72) Inventors: J. Marcus Slagt, Nisse (NL); Alfred K. Schultz, Maple Glen, PA (US)

(73) Assignees: DOW GLOBAL TECHNOLOGIES LLC, Midland, MI (US); ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 15/757,052

(22) PCT Filed: Sep. 14, 2016

(86) PCT No.: PCT/US2016/051577
§ 371 (c)(1),
(2) Date: Mar. 2, 2018

(87) PCT Pub. No.: WO2017/048746
PCT Pub. Date: Mar. 23, 2017

(65) Prior Publication Data
US 2018/0244544 A1 Aug. 30, 2018

Related U.S. Application Data

(60) Provisional application No. 62/305,103, filed on Mar. 8, 2016, provisional application No. 62/218,745, filed on Sep. 15, 2015.

(51) Int. Cl.
*C02F 1/42* (2006.01)
*B01J 49/08* (2017.01)
(Continued)

(52) U.S. Cl.
CPC .............. *C02F 1/42* (2013.01); *B01J 39/05* (2017.01); *B01J 39/20* (2013.01); *B01J 41/05* (2017.01);
(Continued)

(58) Field of Classification Search
None
See application file for complete search history.

(56) References Cited

U.S. PATENT DOCUMENTS 4,082,564 A 4/1978 Fries et al.
4,247,340 A 1/1981 Cartier
(Continued)

FOREIGN PATENT DOCUMENTS

AU 2003213862 A1 10/2003
EP 32671 A2 7/1981
(Continued)

OTHER PUBLICATIONS

Shuang, C. et al; Effect of the Chemical Structure of Anion Exchange Resin on the Adsorption of Humic Acid; Behavior and Mechanism, Journal of Colloid and Intrface Science, vol. 437, (Sep. 16, 2014), pp. 163-169.
(Continued)

*Primary Examiner* — Chester T Barry

(57) ABSTRACT

Provided is a method of purifying water comprising
(a) providing an aqueous solution (A) that has pH of 5.5 or lower and that comprises
(i) one or more dissolved organic compounds in an amount of 5 mg/L or more, measured as dissolved organic carbon, and
(ii) 95% or more water by weight based on the weight of the aqueous solution (A), and
(b) bringing the aqueous solution (A) into contact with a collection of particles of acrylic resin (B) that has calculated Hansch parameter of −1.0 to 2.5, and
(Continued)

(c) then separating an aqueous solution (C) from the collection of particles of acrylic resin (B).

8 Claims, 4 Drawing Sheets

(51) Int. Cl.

| | | |
|---|---|---|
| *B01J 49/57* | (2017.01) | |
| *B01J 47/028* | (2017.01) | |
| *B01J 39/05* | (2017.01) | |
| *B01J 41/05* | (2017.01) | |
| *B01J 39/20* | (2006.01) | |
| *B01J 41/14* | (2006.01) | |
| *C02F 101/30* | (2006.01) | |

(52) U.S. Cl.
CPC ............ *B01J 41/14* (2013.01); *B01J 47/028* (2013.01); *B01J 49/08* (2017.01); *B01J 49/57* (2017.01); *C02F 2001/422* (2013.01); *C02F 2101/30* (2013.01); *C02F 2303/16* (2013.01)

(56) References Cited

U.S. PATENT DOCUMENTS

| | | | |
|---|---|---|---|
| 4,537,683 A | | 8/1985 | Isacoff et al. |
| 4,988,807 A | | 1/1991 | Christensen et al. |
| 8,255,205 B2 | | 8/2012 | Hogan et al. |
| 2013/0303674 A1* | | 11/2013 | Dombrowski ....... C09D 113/02 524/359 |
| 2015/0096940 A1* | | 4/2015 | Arias-Paic ............... B01J 47/04 210/677 |

FOREIGN PATENT DOCUMENTS

| | | |
|---|---|---|
| FR | 1344940 A | 12/1963 |
| JP | 2012012274 A | 1/2012 |
| WO | 2015041866 A1 | 3/2015 |

OTHER PUBLICATIONS

The Cooperative Research Centre for Water Quality and Treatment; Natural Organic Matter; Private Mail Bag 3, Salisbury South Australia 5108.
Bolto, Brian; Removal of Natural Organic Matter by Ion Exchange; Water Research, vol. 36, (2002), pp. 5057-5065.
Brost, H. R.; Adsorberharze, welcher Typ an welcher Stelle; Vom Wasser, vol. 45, pp. 159-178 (English Abstract included).
CBCL Consulting Engineers; Study on Characteristics and Removal of Natural Organic Matter in Drinking Water Systems in Newfoundland and Labrador, Newfoundland Labrador Department of Environment and Conservations, (2011).
Chappelow, C. C.; Photoreactivity of Vinyl/Ether/Oxirane Based Resin Systems; Applied Polymer Science; vol. 86, (2002), pp. 314-326.
Cornielissen, E. R.; Selection of Anionic Exchange Resins for Removal of Natural Organic Matter (NOM) Fractions; Water Research; vol. 42, (2008), pp. 413-423.
DeSilvia, F. J.; Removing Organics With Ion Exchange Resin; Water Conditioning and Purification Magazine, (1977).
Dorfner, K.; Resin Poisoning; Ion Exchangers; Walter de Gruyter, (1991), p. 760.
Eilers, A. K.; Ion Exchange for NOM Removal in Drinking Water Treatment; Delft University of Technology; (2008).
Evans, S.; Removal of Organic Acids from Rhine River Water with Weak Base Resins; Environmental Science and Technology; vol. 13, No. 6, (Jun. 1979).
Grefte, A.; Natural Organic Matter Removal by Ion Exchange at Different Positions in the Drinking Water Lane; Drinking Water Engineering and Science; vol. 6, (2013), pp. 1-10.
Lobanga, K. P.; Comparative Study for the Removal of Natural Organic Matter from Different Raw Waters by Ion Exchange; IWA Specialty Conference on Natural Organic Matter, (2011).
Reckhow, D. A.; Natural Organic Matter in Water; University of Massachusetts.
Schumacher, B. A.; Methods for the Determination of Total Organic Carbon (TOC) in Soils and Sediment; US Environmental Protection Agency, (2002).

* cited by examiner

METHOD OF PURIFYING WATER

It is often desired to purify water. For example, water from natural sources often contains undesirably high levels of dissolved organic compounds. Some of such compounds are humic acids and fulvic acids. It is often desirable to remove some or all of the dissolved organic compounds from the water. In the past, strong base ion exchange resins have been used for removing humic acids and fulvic acids from water. Strong base ion exchange resins, however, have the drawback that they are relatively difficult to regenerate.

Cornelissen et al., in *Water Research*, vol. 42 (2008) pages 413-423, tested a variety of ion exchange resins for their ability to remove humic substances; they tested only one weak base resin, and they reported that the weak base resin was ineffective at removing humic substances. It is desired to provide a method of removing dissolved organic compounds from water without the drawbacks of strong base ion exchange resins.

The following is a statement of the invention.

The first aspect of the present invention is a method of purifying water comprising
(a) providing an aqueous solution (A) that has pH of 5.5 or lower and that comprises
  (i) one or more dissolved organic compounds in an amount of 1 mg/L or more, measured as dissolved organic carbon, and
  (ii) 95% or more water by weight based on the weight of the aqueous solution (A), and
(b) bringing the aqueous solution (A) into contact with a collection of particles of acrylic resin (B) that has calculated Hansch parameter of −1.0 to 2.5, and
(c) then separating an aqueous solution (C) from the collection of particles of acrylic resin (B).

A second aspect of the present invention is a method of regenerating an acrylic resin (B2), comprising
(A) providing a collection of particles of acrylic resin (B2) that has calculated Hansch parameter of −1.0 to 2.5, wherein one or more humic acid, one or more fulvic acid, or a mixture thereof, is adsorbed onto said acrylic resin (B2), and
(B) bringing said collection of particles of acrylic resin (B2) into contact with an aqueous solution (RA) having pH of 4 or lower, to form a mixture B2RA,
(C) then separating acrylic resin (B3) from said mixture B2RA.

A third aspect of the present invention is a method of regenerating an acrylic resin (B2), comprising
(A) providing a collection of particles of acrylic resin (B2) that has calculated Hansch parameter of −1.0 to 2.5, wherein one or more humic acid, one or more fulvic acid, or a mixture thereof, is adsorbed onto said acrylic resin (B2), and
(B) bringing said collection of particles of acrylic resin (B2) into contact with an aqueous solution (RB) having pH of 10 or higher, wherein said aqueous solution (RB) comprises metal cations and hydroxide anions, to form a mixture B2RB,
(C) then separating acrylic resin (B4) from said mixture B2RB.

The following is a brief description of the drawings.

FIG. 1 shows an embodiment of the method of the present invention in which aqueous solution (X) passes through a column containing resin (Y). Aqueous solution (A) exits from the column containing resin (Y) and then passes through a column containing resin (B). Aqueous solution (C) exits from the column containing resin (B) and then passes through a column containing resin (D). Aqueous solution (E) exits from the column containing resin (D).

Figure 4:
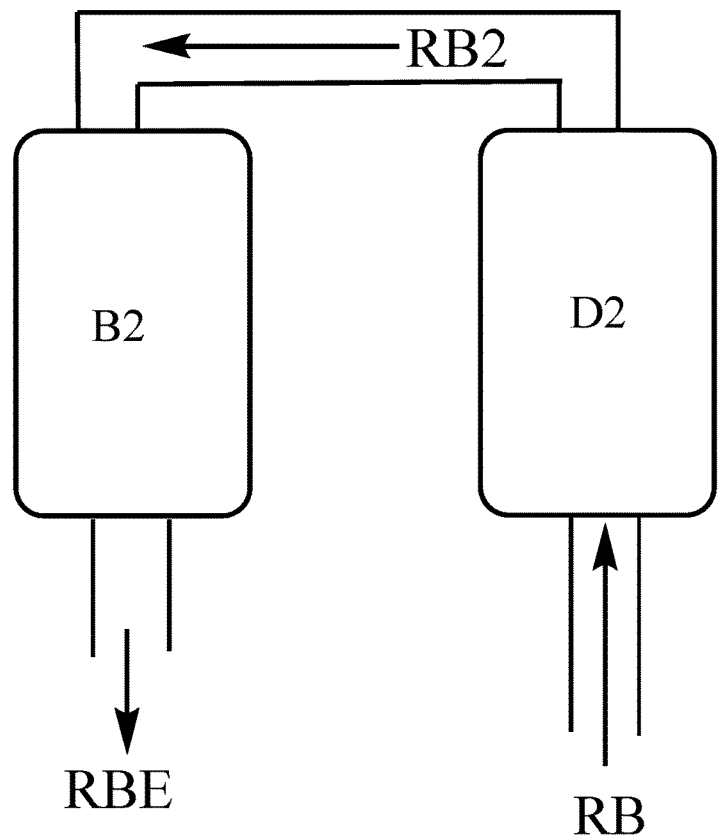

FIG. 4 shows an embodiment in which regeneration aqueous solution (RB) passes through a column containing loaded resin (D2) in the opposite direction in which aqueous solution (C) had passed through the column containing resin (D), and aqueous solution (RB2) exits from the column containing loaded resin (D2). Then, in FIG. 4, aqueous solution (RB2) passes through a column containing loaded resin (B2), and aqueous solution (RB2E) exits from the column containing loaded resin (B2).

The following is a detailed description of the invention.

As used herein, the following terms have the designated definitions, unless the context clearly indicates otherwise.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have the structure I

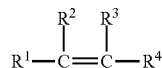

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. Acrylic monomers are monomers selected from substituted and unsubstituted (meth)acrylonitrile, (meth)acrylic acid, alkyl esters of (meth)acrylic acid, amides of (meth)acrylic acid, vinyl chloride, halogenated alkenes, and mixtures thereof. As used herein, the prefix "(meth)acryl-" means either acryl- or methacryl-. "Substituted" means having at least one attached chemical group such as, for example, alkyl group, alkenyl group, vinyl group, hydroxyl group, alkoxy group, carboxylic acid group, other functional groups, and combinations thereof.

As used herein, vinyl aromatic monomers are vinyl monomers in which one or more of $R^1$, $R^2$, $R^3$, and $R^4$ contain one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A polymer in which 90% or more of the polymerized units, by weight based on the weight of the polymer, are polymerized units of one or more vinyl monomers is a vinyl polymer. An acrylic polymer is a vinyl polymer in which 80% or more of the polymerized units, by weight based on the weight of the polymer, have the structure II or the structure III or a mixture thereof:

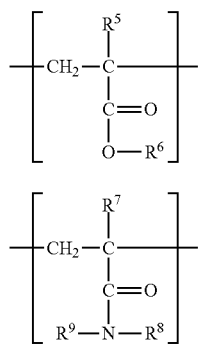

where $R^5$ and $R^7$ are each independently hydrogen or methyl, and where $R^6$, $R^8$, and $R^8$ are each independently hydrogen or a substituted or unsubstituted hydrocarbyl group.

A resin is considered herein to be crosslinked if the polymer chain has sufficient branch points to render the polymer not soluble in any solvent. When it is said herein that a polymer is not soluble in a solvent, it means that less than 0.1 gram of the resin will dissolve in 100 grams of the solvent at 25° C.

A collection of particles is characterized by the diameters of the particles. If a particle is not spherical, the diameter of the particle is considered to be the diameter of a particle having the same volume as the particle. A collection of particles is characterized herein by the volume-average diameter of the collection.

The amount of dissolved organic compounds in water is characterized first filtering the water to remove particles and then by analyzing the total organic carbon (TOC). TOC may be analyzed by using UV/Persulfate oxidation with the membrane conductometric technique, for example with a Sievers TOC Analyzer (from GE).

As used herein, a strong acid resin is a resin having no pendant functional groups other than sulfonic acid groups, except for possible trace impurities. As used herein, a weak acid resin is a resin having no pendant functional groups other than carboxylic acid groups, except for possible trace impurities. As used herein, a strong base resin is a resin having no pendant functional groups other than quaternary ammonium groups, except for possible trace impurities. As used herein, a weak base resin is a resin having no pendant functional groups other than primary amine groups, secondary amine groups, tertiary amine groups, and combinations thereof, except for possible trace impurities.

Humic acid is a naturally-occurring acidic organic substance that normally exists as mixture of similar compounds. A typical humic acid molecule contains aromatic rings, phenolic groups, and carboxyl groups, among other structures. An average chemical formula for humic acid is $C_iH_jO_kN_xS_y$, where i is 170 to 205; j is 170 to 205; k is 80 to 100; x is 7 to 11; and y is 0.5 to 1.5. Generally, for humic acid, the mole ratio of hydrogen to carbon is 0.8:1 to 1.2:1. The fact that the mole ratio of hydrogen to carbon is near 1:1 is generally considered to mean that the humic acid molecule has multiple aromatic rings. Normally the average molecular weight of humic acid is 3,500 to 4,500. Humic acid is insoluble in water at 25° C. at pH of 1.0 or lower.

Fulvic acid is a naturally-occurring acidic organic substance that normally exists as mixture of similar compounds. A typical fulvic acid molecule contains aromatic rings, phenolic groups, and carboxyl groups, among other structures. An average chemical formula for humic acid is $C_pH_qO_rN_wS_z$, where p is 122 to 144; q is 164 to 200; r is 85 to 105; w is 2 to 8; and z is 1 to 4. Generally, for fulvic acid, the mole ratio of hydrogen to carbon is 1.21:1 to 1.5:1. The fact that the mole ratio of hydrogen to carbon is higher than 1:1 is generally considered to mean that the fulvic acid molecule has fewer aromatic rings than the humic acid molecule. Normally the average molecular weight of humic acid is 3,000 to 4,000. Fulvic acid is soluble in water at 25° C. at pH of 1.0 or lower.

Compounds present in water are considered dissolved if they are present as individual molecules solvated in water. Organic compounds are compounds that contain carbon, excluding compounds generally considered to be inorganic. Carbon-containing compounds that are generally considered to be inorganic include the following: binary oxides and sulfides of carbon; ternary metallic cyanides, ternary metallic carbonyls, phosgene, and carbonyl sulfide; and metallic carbonates. The amount of carbon compounds dissolved in a sample of water is characterized herein as the TOC, which is the milligrams of carbon atoms contained in the dissolved organic compounds per liter of solution, measured as described above.

Polymers are said herein to have a calculated Hansch parameter (HPoly) that is determined by the following equation:

$$HPoly=(WFMon1)*(HMon1)+(WFMon2)*(HMon2)+(WFMon3)*(HMon3) \ldots$$

where Mon1, Mon2, etc. are the polymerized monomer units that contained in the polymer; where WFMonX is the weight fraction of MonX; where HMonX is the calculated Hansch parameter of MonX, and where the sum is taken over all of the monomer units contained in the polymer. It is useful to note that $$1=(WFMon1)+(WFMon2)+(WFMon3) \ldots$$

For any particular polymerized monomer unit, the calculated Hansch parameter is calculated based upon the structure of the polymerized unit as it exists in the polymer. If a functional group is added to a polymerized monomer unit after the polymerization process, for purposes of calculating the Hansch parameter, that monomer unit contains the functional group. To illustrate this point, it is useful to consider an amine-functional styrenic polymer (not an example of the present acrylic polymer (B)). A polymer could be made that is a copolymer of styrene (weight fraction WFSty) and divinyl benzene (weight fraction WFDVB). Then chemical reactions could be performed that attached one dimethylaminomethyl group to each aromatic ring in the polymer. Then the two polymerized monomer units considered in the calculation of the Hansch parameter would be the following:

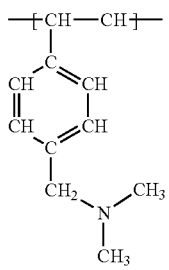
Structure STY-A

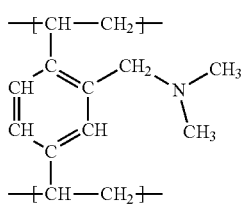
Structure DVB-A

The Hansch parameters of structures STY-A and DVB-A would be determined (labeled HSTY-A and HDVB-A, respectively), and the calculated Hansch parameter of this example polymer would be (WFSTY)*(HSTY-A)+ (WFDVB)*(HDVB-A).

The calculated Hansch parameters of the individual polymerized monomer units are determined as follows. As used herein, the term "Hansch parameter" is an index of hydrophobicity, with higher values indicating greater hydrophobicity, as calculated according to the Kowwin methodology. A tool for this can be downloaded at http://www.epa.gov/oppt/exposure/pubs/episuitedl.htm. The Kowwin methodology uses a corrected "fragment constant" methodology to predict the Hansch parameter, expressed as log P. For any polymerized monomer unit, the molecular structure is divided into fragments each having a coefficient and all coefficient values in the structure are summed together to yield the log P estimate for the polymerized monomer unit. Fragments can be atoms but are larger functional groups (e.g. C=O) if the groups give a reproducible coefficient. The coefficients for each individual fragment were derived by multiple regression of reliably measured log P values (KOWWIN's "reductionist" fragment constant methodology), wherein the log P is measured by testing the fragment in a mixture of water and a given hydrophobic organic solvent. In the corrected fragment constant methodology, the coefficients of groups are adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. A journal article by Meylan and Howard (1995) describes the program methodology as the "Atom/fragment contribution method for estimating octanol-water partition coefficients." J. Pharm. Sci. 1995, 84, 83-92. Hansch parameters can be calculated from coefficient values found at the website listed above. Hansch parameters for common vinyl monomers are available from "Exploring QSAR: Volume 2: Hydrophobic, Electronic and Steric Constants," 1995, American Chemical Society, Washington, D.C.

As used herein A "metal cation" is a cation of an alkali metal, an alkaline earth, or another metal.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The present invention involves the use of an aqueous solution (A). The pH of aqueous solution (A) is 5.5 or lower; preferably 4.5 or lower; more preferably 4.0 or lower. Preferably, the pH of aqueous solution (A) is 2.0 or higher, more preferably 2.5 or higher.

Aqueous solution (A) contains dissolved organic compounds. The amount of dissolved organic compounds, measured as the total organic carbon (TOC), is preferably 1 mg/L or higher; more preferably 2 mg/L or higher; more preferably 5 mg/L or higher; more preferably 10 mg/L or higher; more preferably 20 mg/L or higher.

The dissolved organic compounds preferably contain one or more humic acid, one or more fulvic acid, or a mixture thereof. Preferably the portion of the TOC that derives from humic acid or fulvic acid is, by weight based on the weight of the TOC, 10% or more; more preferably 20% or more; more preferably 50% or more.

Aqueous solution (A) contains water in an amount, by weight based on the weight of aqueous solution (A), of 95% or more; more preferably 98% or more; more preferably 99% or more.

The practice of the present invention involves bringing aqueous solution (A) into contact with a collection of particles of acrylic resin (B). Preferably the amount of polymerized units in acrylic resin (B) that have the structure II or the structure III is, by weight based on the dry weight of the collection of particles of acrylic resin (B), 80% or more; more preferably 90% or more; more preferably 95% or more.

Acrylic resin (B) has calculated Hansch parameter of -1.0 to 2.5. Preferably, acrylic resin (B) has calculated Hansch parameter of -0.8 or higher; more preferably -0.6 or higher; more preferably -0.4 or higher; more preferably -0.2 or higher. Preferably, acrylic resin (B) has calculated Hansch parameter of 1.5 or lower; more preferably 1.0 or lower; more preferably 0.5 or lower; more preferably 0.2 or lower.

Preferably, acrylic resin (B) is a polymer that has pendant groups, and preferably some or all of the pendant groups contain one or more functional groups. The functional groups pendant on acrylic resin (B) are preferably selected from the group consisting of primary amine groups, secondary amine groups, tertiary amine groups, and combinations thereof. Preferably acrylic resin (B) is a weak base resin.

Preferred acrylic resin (B) contains polymerized units of structure III or structure IV or structure V

IV

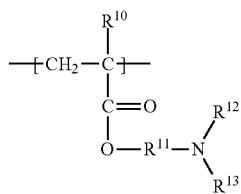

-continued

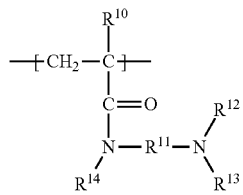

V where $R^{10}$ is hydrogen or methyl, where $R^{11}$, $R^{12}$, and $R^{13}$ is each a substituted or unsubstituted hydrocarbyl group, and where $R^{14}$ is either hydrogen or a substituted or unsubstituted hydrocarbyl group. Suitable divalent groups for $R^{11}$ include substituted and unsubstituted 1-,1-methyl; 1-,1-ethyl; 1-,2-ethyl; 1-,3-propyl; 1-,2-(1-methylethyl), 1-,2-(2-methylethyl), 1-,4-butyl; 1-,3-(1-methylpropyl); 1-,3-(2-methylpropyl); 1-,3-(3-methylpropyl); 1-,2-(1-ethylethyl); 1-,2-(2-ethylethyl); 1-,5-pentyl; 1-,4-(1-methylbutyl); 1-,4-(2-methylbutyl); 1-,4-(3-methylbutyl); 1-,4-(4-methylbutyl); 1-,3-(1-ethylpropyl); 1-,3-(2-ethylpropyl); 1-,3-(3-ethylpropyl); 1-,3-(1-,2-dimethylpropyl); 1-,3-(1-,3-dimethylpropyl); 1-,3-(2-,3-dimethylpropyl); 1-,6-hexyl; 1-,5-(1-methylpentyl); 1-,5-(2-methylpentyl); 1-,5-(3-methylpentyl); 1-,5-(4-methylpentyl); 1-,4-(1-ethylbutyl); 1-,4-(2-ethylbutyl); 1-,4-(3-ethylbutyl); 1-,4-(1-,2-dimethylbutyl); 1-,4-(1-,3-dimethylbutyl); 1-,4-(2-,3-dimethylbutyl); methoxy, dimethoxy, trimethoxy, polymethoxy (having 4 to 10 methoxy groups), polymethoxy (having 11 to 100 methoxy groups), ethoxy, diethoxy, triethoxy, polyethoxy (having 4 to 10 ethoxy groups), polyethoxy (having 11 to 100 methoxy groups), propoxy, dipropoxy, tripropoxy, polypropoxy, methoxyethoxy, ethoxymethoxy, polyethoxypolymethoxy (having 4 to 10 ethoxy and/or methoxy groups), polyethoxypolymethoxy (having 11 to 100 ethoxy and/or methoxy groups), and combinations thereof, where suitable substituents include hydroxy groups, alkoxy groups, amine groups, and combinations thereof.

Suitable monovalent groups for $R^8$, $R^9$, $R^{12}$, and $R^{13}$ independently include substituted and unsubstituted methyl; ethyl; 1-propyl; 2-propyl, 1-butyl; 2-butyl; 1-(2-methylpropyl); 2-(2-methylpropyl); 1-pentyl; 2-pentyl; 3-pentyl; 1-(1-methylbutyl); 1-(2-methylbutyl); 1-(3-methylbutyl); 1-(4-methylbutyl); 1-(1-ethylpropyl); 1-(2-ethylpropyl); 1-(3-ethylpropyl); 1-(1-,2-dimethylpropyl); 1-(1-,3-dimethylpropyl); 1-(2-,3-dimethylpropyl); 1-hexyl; 1-(1-methylpentyl); 1-(2-methylpentyl); 1-(3-methylpentyl); 1-(4-methylpentyl); 1-(1-ethylbutyl); 1-(2-ethylbutyl); 1-(3-ethylbutyl); 1-(1-,2-dimethylbutyl); 1-(1-,3-dimethylbutyl); 1-(2-,3-dimethylbutyl); methoxy, dimethoxy, trimethoxy, polymethoxy (having 4 to 10 methoxy groups), polymethoxy (having 11 to 100 methoxy groups), ethoxy, diethoxy, triethoxy, polyethoxy (having 4 to 10 ethoxy groups), polyethoxy (having 11 to 100 methoxy groups), propoxy, dipropoxy, tripropoxy, polypropoxy, methoxyethoxy, ethoxymethoxy, polyethoxypolymethoxy (having 4 to 10 ethoxy and/or methoxy groups), polyethoxypolymethoxy (having 11 to 100 ethoxy and/or methoxy groups), and combinations thereof, where suitable substituents include hydroxy groups, alkoxy groups, amine groups, and combinations thereof.

When $R^{14}$ is not a hydrogen, the list of suitable groups for $R^{14}$ is the same as the list for $R^8$, though $R^{14}$ and $R^8$ may be chosen independently of each other.

Preferably acrylic resin (B) contains polymerized units of one or more multivinyl monomer. Suitable multivinyl monomers include, for example, divinyl benzene; ethylene glycol divinyl ether; diethylene glycol divinyl ether; triethylene glycol divinyl ether; polyethylene glycol divinyl ether; alkyl diol di(meth)acrylates (including 1,6-hexanediol diacrylate; 1,6-hexanediol dimethacrylate; 1,9-nonanediol dimethacrylate; and 1,4-butanediol dimethacrylate; 1,10-decanediol diacrylate; 3-methyl 1,5-pentanediol diacrylate; tricyclodecanedimethanol diacrylate); ethoxylated 3 bisphenol A diacrylate; Dipropylene glycol diacrylate; 2-Bis(4-methacryloxyphenyl)propane; allyl acrylate; allyl methacrylate; tetraethylene glycol diacrylate; tripropylene glycol diacrylate; polybutadiene diacrylate; pentaerythritol triacrylate; 1,1,1-trimethylolpropane triacrylate; 1,1,1-trimethylolpropane trimethacrylate; PEO(5800)-b-PPO(3000)-b-PEO(5800) dimethacrylate (PEO is polyethylene oxide, and PPO is polypropylene oxide); [PEO(10700)-b-PPO(4500)]4-ethylenediamine tetramethacrylate; dipentaerythritol pentaacrylate; pentaerythritol tetraacrylate; di-trimethylolpropane tetraacrylate; tris (2-hydroxyethyl) isocyanurate triacrylate; dipentaerythritol pentaacrylate; ethoxylated (20) trimethylolpropane triacrylate; and mixtures thereof.

Acrylic resin (B) is in the form of particles. Preferably, the volume average particle diameter is 20 μm or larger, more preferably 50 μm or larger; more preferably 100 μm or larger. Preferably, the volume average particle diameter is 1000 μm or smaller.

Preferably, acrylic resin (B) is not soluble in water. Preferably, acrylic resin (B) is crosslinked.

Acrylic resin (B) may be either a gel resin or a macroporous resin. Gel resins have average pore size of less than 17 Å, while macroporous resins have pore size of 17 to 500 Å. Average pore size is determined as follows. First, the resin surface area (RSA) is determined for a collection of particles, using the BET method. Then the resin pore volume (RPV) is determined for the same resin. For the pore volume, the single point test is used, at pressure value of P/Po of 0.980 or greater, where Po is ambient pressure. The pore volume is calculated as follows: at the maximum P/Po, a single point is observed, and the moles of adsorbed gas (Nmax) is noted at that point. The moles of adsorbed gas is considered to occupy volume V as given by the ideal gas law: $V=Nmax*R*T/P$ (where R is the gas constant and T is the absolute temperature). That volume V is reported as the pore volume (RPV). For the average pore size, the result reported is 4*(RPV)/(RSA).

Preferably, acrylic resin (B) is not loaded with adsorbed organic compounds. The amount of adsorbed organic compounds is determined by contacting acrylic resin (B) with an equal volume of an aqueous test solution (TS), allowing the mixture to stand for 4 hours at 23° C., then separating the liquid portion from the mixture, then analyzing the liquid portion for dissolved organic compounds using the acidic $KMnO_4$ method (which gives results in units of g $O_2$ per L of resin). The aqueous test solution (TS), prior to use, has less than 10 ppb of organic compounds. The aqueous test solution (TS) has pH in the range −2 to 15 and may or may not have one or more dissolved inorganic salt. There is no chemical reaction between aqueous test solution (TS) and acrylic resin (B). Aqueous test solution (TS) is chosen to effectively remove any adsorbed organic compounds that may be resident on acrylic resin (B). Preferably the amount of adsorbed organic compounds resident on acrylic resin (B) is 0.1 g $O_2$ per L of resin or less.

When acrylic resin (B) is in contact with aqueous solution (A), the combination is herein referred to as mixture BA. It is contemplated that during the contact of acrylic resin (B) with aqueous solution (A), some or all of the humic acid and/or fulvic acid transfers from aqueous solution (A) to acrylic resin (B). After this contact, an aqueous solution (C) is separated from mixture BA. Preferably, the ratio of the concentration of humic acid in aqueous solution (C) to the concentration of humic acid in aqueous solution (A) is 0.5:1 or smaller; more preferably 0.2:1 or smaller; more preferably 0.1:1 or smaller; more preferably 0.05:1 or smaller; more preferably 0.02:1 or smaller; more preferably 0.01:1 or smaller. Preferably, the ratio of the concentration of fulvic acid in aqueous solution (C) to the concentration of fulvic acid in aqueous solution (A) is 0.5:1 or smaller; more preferably 0.2:1 or smaller; more preferably 0.1:1 or smaller; more preferably 0.05:1 or smaller; more preferably 0.02:1 or smaller; more preferably 0.01:1 or smaller.

One method of making mixture BA and then separating aqueous solution (C) is to place both aqueous solution (A) and acrylic resin (B) into a container, stir the mixture, and then remove the aqueous solution (C), by settling, by pouring off the liquid, by centrifugation, by filtration, or by a combination thereof. Preferably, a collection of particles of acrylic resin (B) is placed into a container, such as, for example, a chromatography column, that retains the particles of acrylic resin (B) while allowing water to pass through the container, and then aqueous solution (A) is forced into the container through an inlet by gravity or pressure or a combination thereof, and aqueous solution (C) is allowed to exit from the container through an outlet. When aqueous solution (C) has been separated from mixture BA, the remaining portion of mixture BA is acrylic resin (B2).

It is contemplated that the process of making mixture BA and then separating aqueous solution (C) will transfer dissolved organic compounds from aqueous solution (A) to acrylic resin (B), so that aqueous solution (C) will have a lower concentration of dissolved organic compounds that aqueous solution (A).

It is useful to consider the origin of aqueous solution (A). Preferably, aqueous solution (A) is produced by a process in which an aqueous solution (X) is brought into contact with a collection of particles of resin (Y) to make a mixture YX. Preferably, the liquid portion of mixture YX is separated from the remainder of mixture YX, and that liquid portion is aqueous solution (A).

Aqueous solution (X) has the same preferred ranges of concentration of humic acid as aqueous solution (A). Aqueous solution (X) has the same preferred ranges of concentration of fulvic acid as aqueous solution (A). Aqueous solution (X) has the same preferred ranges of amount of water as aqueous solution (A).

Preferably, aqueous solution (X) has pH of 5 or higher; more preferably 6 or higher. Preferably, aqueous solution (X) has pH of 9 or lower, more preferably 8 or lower.

Preferably, aqueous solution (X) is taken directly from one or more natural source such as a river, stream, lake, pond, or reservoir. It is contemplated that some physical purification steps may be performed, such as filtration to remove contaminants that are in the form of particles, may optionally be performed on an aqueous solution taken from a natural source prior to using that aqueous solution as aqueous solution (X). Preferably, after an aqueous solution is removed from a natural source, no purification steps other than filtration to remove particles are performed on the aqueous solution prior to use as aqueous solution (X).

Preferably, resin (Y) is a cation exchange resin having pendant cation exchange groups. Preferably, resin (Y) comprises pendant chemical groups selected from the group consisting of sulfonate groups, carboxylate groups, or a mixture thereof. Preferably, some or all of the pendant cation exchange groups are in hydrogen form. More preferably, resin (Y) comprises pendant sulfonate groups.

Preferably, resin (Y) comprises polymerized units of one or more vinyl aromatic monomer. Preferably, the amount of polymerized units of vinyl aromatic monomer in resin (Y) is, by weight based on the weight of resin (Y), 50% or more; more preferably 75% or more; more preferably 90% or more. Preferably, at the beginning of performing the method of the present invention, resin (Y) is in hydrogen form.

Preferred methods of bringing aqueous solution (X) into contact with a collection of particles of resin (Y) to make a mixture YX and then separating liquid portion of mixture YX from the remainder of mixture YX are the same as the preferred methods described above for mixture BA. The methods for making and separating mixture YX may be chosen independently of those chosen for making and separating mixture BA.

It is contemplated that aqueous solution (X) contains one or more metal cations. Preferably, the process of making mixture YX and aqueous solution (A) from mixture YX causes a transfer of metal cations from aqueous solution (X) to resin (Y). Preferably the concentration of metal cations in aqueous solution (A) is lower than the concentration of metal cations in aqueous solution (X).

After aqueous solution (C) is obtained, aqueous solution (C) is preferably treated by bringing the aqueous solution (C) into contact with a collection of particles of resin (D) to make a mixture DC. Preferably the liquid portion of the mixture DC is then separated from the mixture DC, and that liquid portion is aqueous solution (E). Preferably, resin (D) is an anion exchange resin having pendant anion exchange groups. Preferably, resin (D) is a strong base resin. Preferably, resin (D) comprises pendant tertiary ammonium groups. Preferably, some or all of the anion exchange groups pendant or resin (D) are in hydroxide form.

Preferably, resin (D) has polymerized units of one or more vinyl aromatic monomer. Preferably, the amount of polymerized units of vinyl aromatic monomer in resin (D) is, by weight based on the weight of resin (D), 50% or more; more preferably 75% or more; more preferably 90% or more.

Preferred methods of bringing aqueous solution (C) into contact with a collection of particles of resin (D) to make a mixture DC and then separating liquid portion of mixture DC from the remainder of mixture DC are the same as the preferred methods described above for mixture BA. The methods for making and separating mixture DC may be chosen independently of those chosen for making and separating mixture BA. After separating aqueous solution (E) from mixture DC, the remainder of mixture DC contains resin (D2).

It is contemplated that contact between aqueous solution (C) and resin (D) will cause non-hydroxide anions to transfer from aqueous solution (C) to resin (D) in exchange for hydroxide anions. Preferably, the concentration of non-hydroxide anions in aqueous solution (D) is higher than the concentration of non-hydroxide anions in aqueous solution (E).

Preferably, aqueous solution (E) has relatively low concentration of metal cations, relatively low concentration of non-hydroxide anions, and relatively low concentration of dissolved organic compounds.

After aqueous solution (C) has been removed from mixture BA, the remaining solid portion to mixture BA is acrylic resin (B2). Acrylic resin (B2) preferably has adsorbed humic acid, fulvic acid, or a mixture thereof.

It is contemplated that, as more dissolved organic compounds become adsorbed onto acrylic resin (B2), then acrylic resin (B2) will become less effective at removing dissolved organic compounds from aqueous solution (A). Acrylic resin (B2) is considered to be "loaded" when acrylic resin (B2) loses effectiveness at removing organic compounds from aqueous solution (A). Preferably, when the method of the present invention is begun, the ratio of the TOC of aqueous solution (C) to the TOC of aqueous solution (A) will be 0.5:1 or lower; more preferably 0.25:1 or lower. After some time of performing the method of the present invention, it is expected that the ratio of the TOC of aqueous solution (C) to the TOC of aqueous solution (A) will rise and will continue to rise as the method of the present invention is performed for longer times. When the ratio of TOC of aqueous solution (C) to the TOC of aqueous solution (A) reaches or exceeds 0.8:1, the acrylic resin (B2) is said to be "loaded." Usually, loaded acrylic resin has adsorbed organic content (as measured by the acidic $KMnO_4$ test, described below) of 3.36 g $O_2$ per liter of resin or more.

Preferably, when acrylic resin (B2) is loaded, a process of "regeneration" is performed to remove dissolved organic compounds from acrylic resin (B2). It is contemplated that such regeneration would convert acrylic resin (B2) back into acrylic resin (B), which could then be used in the process of the present invention to remove dissolved organic compounds from aqueous solution (A).

Preferably, regeneration involves bringing an aqueous solution (R) into contact with acrylic resin (B2) to form a mixture B2R and then separating acrylic resin from aqueous solution (RE). Preferably, aqueous solution (R) is either acidic, having pH of 4 or lower, or is basic, having pH of 10 or higher.

One preferred method of regeneration is acid regeneration. In acid regeneration, it is preferred to bring acrylic resin (B2) into contact with an aqueous solution (RA), where aqueous solution (RA) has pH of 4 or below to form a mixture B2RA.

Preferably, aqueous solution (RA) has pH of 2 or lower; more preferably pH of 1 or lower; more preferably pH of zero or lower. Negative values of pH are considered to be lower than zero.

Preferably, aqueous solution (RA) does not have both dissolved metal ions and dissolved non-hydroxide anions. Aqueous solution (RA) may be characterized by a "salt ratio," which is defined as the mole ratio of all dissolved metal ions to all dissolved non-hydroxide anions. Preferably the salt ratio in aqueous solution (RA) is less than 0.1:1, more preferably less than 0.01:1.

Preferably, mixture B2RA is separated into acrylic resin (B3) and aqueous solution (RAE). Preferably, acrylic resin (B3) is suitable for use as acrylic resin (B).

Another preferred method of regeneration is base regeneration. In base regeneration, it is preferred to bring acrylic resin (B2) into contact with an aqueous solution (RB), where aqueous solution (RB) has pH of 10 or higher, to form a mixture B2RB.

Preferably, aqueous solution (RB) has pH of 12 or higher; more preferably 13 or higher; more preferably 14 or higher.

Preferably, aqueous solution (RB) contains metal cations, hydroxide anions, and non-hydroxide anions. Preferred metal cations are alkali metal cations; more preferred are sodium ions. Preferred aqueous solution (RB) has effectively only one type of metal cation. Preferably, in aqueous solution (RB) the ratio of the weight of the most concentrated metal cation to the sum of the weights of all other metal cations is 10:1 or more; more preferably 100:1 or more. Preferred non-hydroxide anions are halide anions; more preferred is chloride anion. Preferred aqueous solution (RB) has effectively only one type of non-hydroxide anion. Preferably, in aqueous solution (RB) the ratio of the weight of the most concentrated non-hydroxide anion to the sum of the weights of all other non-hydroxide anions is 10:1 or more; more preferably 100:1 or more.

Preferably, the amount of dissolved metal ion in aqueous solution (RB) is, by weight based on the weight of aqueous solution (RB), 1% or more; more preferably 2% or more; more preferably 3% or more; more preferably 4% or more. Preferably, the amount of dissolved metal ion in aqueous solution (RB) is, by weight based on the weight of aqueous solution (RB), 10% or less; more preferably 9% or less; more preferably 8% or less; more preferably 7% or less.

Preferably, the amount of hydroxide ion in aqueous solution (RB) is, by weight based on the weight of aqueous solution (RB), 1% or more; more preferably 2% or more; more preferably 3% or more. Preferably, the amount of hydroxide ion in aqueous solution (RB) is, by weight based on the weight of aqueous solution (RB), 9% or less; more preferably 8% or less; more preferably 7% or less; more preferably 6% or less; more preferably 5% or less.

Preferably, the amount of non-hydroxide anion in aqueous solution (RB) is, by weight based on the weight of aqueous solution (RB), 0.3% or more; more preferably 0.4% or more; more preferably 0.5% or more. Preferably, the amount of non-hydroxide ion in aqueous solution (RB) is, by weight based on the weight of aqueous solution (RB), 5% or less; more preferably 3% or less; more preferably 2% or less; more preferably 1.5% or less.

Preferably, mixture B2RB is separated into acrylic resin (B4) and aqueous solution (RBE). Preferably, acrylic resin (B4) is suitable for use as acrylic resin (B).

In a preferred embodiment (herein called "double base regeneration") of base regeneration, aqueous solution (RB) is used to regenerate both acrylic resin (D2) and acrylic resin (B2). In double base regeneration, aqueous solution (RB) is brought into contact with resin (D2) to form mixture RBD2; then aqueous solution (RB2) is separated from mixture RBD2; then aqueous solution (RB2) is brought into contact with resin (B2) to form mixture B2RB2; then aqueous solution (RE) is separated from mixture B2RB2. When aqueous solution (RE) is separated from mixture B2RB2, the remaining material in mixture B2RB2 contains resin that is preferably suitable for use as acrylic resin (B). Double base regeneration may be performed by providing resin (D2) and acrylic resin (B2) each in a separate vessel (such as a chromatography column) that retains the resin while allowing aqueous solutions to pass through after contacting the resin; then passing aqueous solution (RB) through the vessel that contains resin (D2); collecting aqueous solution (RB2) that exits from the vessel that contains resin (D2); then passing aqueous solution (RB2) through the vessel that contains acrylic resin (B2); then collecting aqueous solution (RBE) that exits from the vessel that contains acrylic resin (B2). It is contemplated that when a sufficient amount of aqueous solution (RB) has passed through both vessels, resin (D2) will have been fully or partially converted to hydroxide form and will be suitable for use as resin (D) and that acrylic resin (B2) will have lost most or all of the adsorbed dissolved organic compounds and will be suitable for use as acrylic resin (B).

The following are examples of the present invention. All operations were performed at room temperature, approximately 23° C., unless otherwise stated.

The following abbreviations are used:
DVB=divinylbenzene
h=hour

BV=bed volume
aqu=aqeuous
soln.=solution
Scav1=acrylic resin having Hansch parameter of −0.1
Scav2=acrylic resin having Hansch parameter of 0.0
ppm C/L=parts per million by weight of carbon per liter
RW=river water after filtration through sand; average TOC=2.6 ppm C/L (minimum TOC=1.9 ppm C/L, and maximum TOC=3.9 ppm C/L). In the examples below, RW always had pH between 2.5 and 3.2.
TOC=Dissolved organic carbon, measured using SIEVERS 900 analyzer from GE Power & Water.
WB1=AMBERLITE™ IRA96, macroporous Styrene/DVB copolymer having pendant tertiary amine groups, Hansch parameter in the range of 2.6 to 2.8.
SB1=AMBERLITE™ IRA900, strong base macroporous Styrene/DVB copolymer, Hansch parameter in the range of −1.6 to −1.4.

Some samples were analyzed for their adsorbed organic content by the "acidic $KMnO_4$ test," which was performed as follows: A solution of $KMnO_4$ was prepared (0.395 g $KMnO_4$ per 1000 mL of deionized water). A solution of ammonium iron(II) sulfate was prepared (4.9 grams of ammonium iron(II) sulfate was dissolved in 200 mL deionized water; 2 mL of 95% (by weight) sulfuric acid was added, and deionized water was added to make 1000 mL). The solution to be tested was diluted with deionized water to 100 mL; the dilution factor is the quotient of 100 mL divided by the initial volume of the solution to be tested. 100 mL of diluted solution to be tested was mixed with 2 mL of 5 N sulfuric acid, followed by 20 mL of the $KMnO_4$ solution. The solution was boiled for 10 minutes, then cooled to 25° C. Then 20 mL of ammonium iron(II) sulfate solution was added. The solution was titrated with $KMnO_4$ solution; end point was determined potentiometrically. Volume of $KMnO_4$ solution titrated was V1, in units of mL. The method is repeated with "diluted solution to be tested" replaced by deionized water, and the titrated volume is V2, in units of mL. Organic content is reported as grams of $O_2$ per liter of resin ($mgO_2/L$) from the following formula.

$$(V1-V2)*(Dilution\ Factor)$$

Examples 1 and 2, and Comparative Example 3C

Effect of the pH of Aqueous Solution (A)

Figure 1:
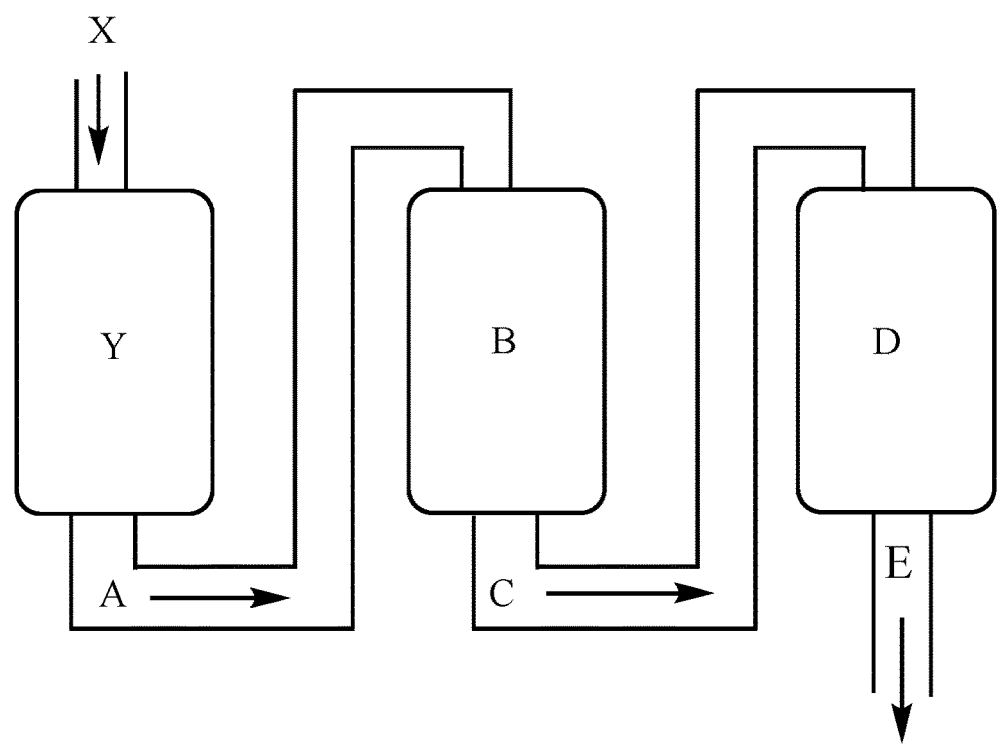
Figure 2:
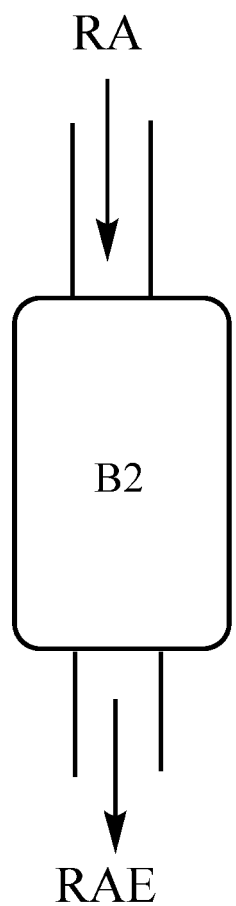
FIG. 2 shows an embodiment in which regeneration aqueous solution (RA) passes through a column containing loaded resin (B2), and aqueous solution (RAE) exits from the column containing loaded resin (B2).
Figure 3:
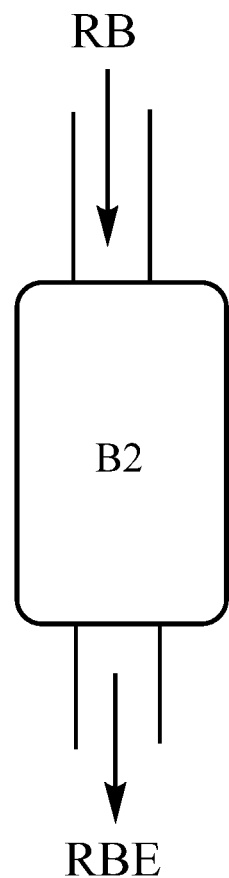
FIG. 3 shows an embodiment in which regeneration aqueous solution (RB) passes through a column containing loaded resin (B2), and aqueous solution (RBE) exits from the column containing loaded resin (B2).

Examples 1 and 2 employed a configuration described by FIG. 1, as follows:
Cation Exchange resin (Y)=either AMBERJET™ UP1400 resin or AMBERJET™ 1500 resin (both from Dow Chemical Company). Both are gel type, sulfonic acid-functional, polystyrene divinylbenzene copolymer resins. These two resins are considered to be interchangeable in the present method. Both were in hydrogen form at the beginning of performing the method.
Anion Exchange Resin (D)=AMBERLITE™ IRA900 strong base anion exchange resin, styrene/DVB copolymer with pendant triethylammonium groups (The Dow Chemical Company)
Flow Direction: top to bottom in each vessel
Vessel Dimensions: 3 cm internal diameter, 28.3 cm bed depth
Flow Rate: 3 L/h
Specific Flow Rate: 15 BV/h
RW had TOC of 3.8 ppm C/L.
pH of aqueous solution (A), the input stream to acrylic resin (B) was between 2.5 and 3.2
Example 1 Acrylic Resin (B)=Scav1
Example 2 Acrylic Resin (B)=Scav2

Comparative Example 3C employed a configuration as in Example 1, using the same resins and the same RW and the same conditions, except that the order of the vessels was as follows: Scav1 followed by cation exchange resin (Y) followed by AMBERLITE™ IRA900. Filtered river water RW entered the vessel containing Scav1.

The output stream from the final vessel was analyzed. Results were as follows:

TABLE 1

Examples 1 and 2 vs. Comparative Example 3C
TOC of final output stream (ppm C/L)

| BV | Ex. 1 | Ex 2 | C. Ex. 3C |
|---|---|---|---|
| 0 | 0.6 | 0.6 | 0.6 |
| 100 | 0.7 | 0.7 | 0.7 |
| 200 | 0.8 | | 1.7 |
| 275 | | 1.1 | |
| 300 | 0.8 | | 2.9 |
| 400 | 0.8 | | 2.8 |
| 420 | | 1.0 | |
| 500 | 0.9 | | 2.8 |
| 600 | 1.2 | | 3.0 |
| 630 | | 1.2 | |
| 700 | 1.1 | | 3.6 |
| 710 | | 0.8 | |
| 800 | 1.2 | | |
| 870 | | 0.8 | |
| 900 | 1.2 | | |
| 930 | | 1.2 | |
| 1000 | 1.3 | 1.3 | |

Both Example 1 and Example 2 maintained TOC of below 15 ppm C/L for more than 1200 BV. In contrast, Comparative Example 3C showed TOC of nearly the same as the filtered river water at 700 BV.

Examples 4 and 5 Comparative Example 6C

Regeneration with Acid

Scavenger resin Scav1 was loaded with dissolved organic compounds using the procedure of Example 1, until the ratio of the TOC of aqueous solution (C) to the TOC of aqueous solution (A) reached 0.8:1.

Then Scav1 resin was regenerated as follows.

TABLE 2

Regeneration Conditions

| | Example 4 | Example 5 | Comp. Example 6C |
|---|---|---|---|
| Direction | top to bottom | top to bottom | top to bottom |
| Regenerant | aqu. HCl soln. | aqu. NaOH soln. | caustic brine[1] |
| Quantity (g100%/Lr) | 90 | 83 | 100 (NaCl) |
| Concentration (% wt) | 5 | 5 | see note[1] |
| Flow Rate | mL/h | 400 | 400 |
| Specific Flow Rate | BV/h | 2 | 2 |
| Duration (min) | 54 | 50 | 90 |

Note[1]: aqueous solution of 10% by weight NaCl and 1% by weight NaOH

After regeneration, the procedure of Example 1 was repeated, using regenerated Scav1 as resin (B) with the following results. Feed water had TOC of 2.6 ppm C/L.

TABLE 3

Example 4 vs. Comparative Example 5C
TOC of final output stream (ppm C/L)

| BV | Ex. 4 | Ex. 5 | Comp. Ex. 6C |
|---|---|---|---|
| 0 | 0.6 | 0.7 | 0.6 |
| 100 | 0.7 | 0.5 | 0.7 |
| 200 | 0.7 | 0.5 | 3.2 |
| 300 | 0.8 | 0.2 | 1.8 |
| 400 | 0.8 | 0.5 | 1.8 |
| 500 | 0.9 | 0.4 | 1.6 |
| 600 | 1.3 | 1.2 | 1.7 |
| 700 | 1.2 | 5.0 | 1.4 |
| 800 | 1.1 | 1.2 | 1.5 |
| 900 | 1.2 | 0.9 | 1.4 |
| 1000 | 1.1 | 1.1 | 1.3 |
| 1100 | 1.0 | 1.7 | 1.2 |
| 1200 | 1.1 | | |

Example 4 behaves well, removing TOC effectively from the feed water. Example 5 behaves well for 600 bed volumes. It is noted that Example 5 showed a sharp rise in TOC of short duration at around 600 BV, after which the resin operates acceptably. This short sharp rise is thought to be related to be related to ionic exhaustion and a change in chemical form of the resin. Such a short sharp rise is expected when using resin regenerated with acid. The time of the occurrence of the short sharp rise (i.e., the BV at which the short sharp rise is observed) is expected to depend on the composition of the water being treated. Example 6C behaves poorly, allowing relatively large amounts of TOC to pass through.

Example 7

Behavior of Scav2

Example 1 was repeated, with Scav2 in place of Scav1. Results were as follows:

TABLE 4

Example 7: TOC of final output stream (ppm C/L)

| BV | 0 | 100 | 200 | 230 | 250 | 520 | 550 | 700 | 800 |
|---|---|---|---|---|---|---|---|---|---|
| TOC | 0.6 | 0.7 | 0.8 | 1.2 | 0.7 | 1.0 | 0.7 | 1.0 | 1.1 |

| BV | 900 | 1050 | 1100 | 1350 | 1400 |
|---|---|---|---|---|---|
| TOC | 0.7 | 1.7 | 0.8 | 1.0 | 1.7 |

Example 7 behaves similarly to Example 1.

Example 8 and Comparative Example 9C

Comparison of Resin Types

The procedure of Example 1 was repeated, except that the TOC of the feed water was 2.1 ppb C/L. As resin (B), the following were used:

Example 8 Scav1

Comparative Example 9C: WB1 (AMBERLITE™ IRA96)

Results were as follows.

TABLE 5

Example 8 and Comparative Example 9C: TOC of final output stream (ppm C/L)

| | BV | | | | | | | |
|---|---|---|---|---|---|---|---|---|
| | 0 | 100 | 400 | 500 | 750 | 800 | 1000 | 1200 |
| Ex. 8 | 1.2 | 0.7 | 0.7 | 0.8 | 0.9 | | 1.0 | 1.1 |
| C. Ex. 9C | 0.6 | 0.9 | 0.8 | 0.8 | | 1.0 | 1.1 | 1.1 |

TOC of final output stream (ppm C/L) (continued)

| | BV | | | | | | | |
|---|---|---|---|---|---|---|---|---|
| | 1400 | 1500 | 1600 | 1650 | 1700 | 1800 | 2000 | 2250 | 2300 |
| Ex. 8 | 1.1 | | 1.2 | 1.2 | 1.2 | 1.3 | 1.5 | 1.7 | 2.4 |
| C. Ex. 9C | | 1.1 | 1.6 | 2.0 | 2.2 | | | | |

Comparative Example 9C shows "breakthrough" (where the output TOC becomes higher than the concentration of TOC in the feed stream) relatively early, at around 1500 BV, whereas Example 8 shows breakthrough much later, at around 2300 BV. In this Example, the organic content of the loaded resin at the conclusion of the procedure was 4.5 g $O_2$ per liter of resin.

Comparative Example 10C

Strong Base Resin

Example 1 was repeated, except that resin (B) was comparative resin SB1 (AMBERLITE™ IRA900, in Cl form). The results for Example 10C may be directly compared to the results for Example 1.

TABLE 6

Comparative Example 10C: TOC of final output stream (ppm C/L)

| | BV | | | | | | | |
|---|---|---|---|---|---|---|---|---|
| | 0 | 100 | 200 | 300 | 400 | 500 | 600 | 700 |
| C. Ex. 10C | 7.8 | 1.6 | 3.2 | 1.6 | 1.7 | 1.8 | 3.1 | 1.3 |

TOC of final output stream (ppm C/L) (continued)

| | BV | | | | |
|---|---|---|---|---|---|
| | 800 | 900 | 1000 | 1100 | 1200 |
| C. Ex. 10C | 1.5 | 1.3 | 1.3 | 1.2 | 1.6 |

Examples 11 and 12

Removal of Organic Compounds from Loaded Scav1

Resin Scav1 was used in the procedure of Example 1 until the resin was loaded according to the criterion described above.

Removal of organic compounds from the loaded Scav1 resin was tested as follows. 20 ml of loaded resin was mixed with 20 ml of regeneration solution. This portion of regeneration solution is known herein as the "first regeneration bed volume," or "first regen. bed vol." The mixture was allowed to stand for 1 hour. Then the resin was removed from the regeneration solution, the resin was air scoured, and the regeneration solution was tested for organic content by the acidic $KMnO_4$ test described above. The dilution factor was 5, and the volume of resin is the same as the volume of regeneration solution, so the formula (V1−V2)*5/1000 gives grams of $O_2$ per liter of resin, which is reported below.

Then the same regeneration solution was re-mixed with the resin, and the process was repeated, with measurements taken at the end of 2, 3, and 4 hours. These measurements are reported as the results for the "first regeneration bed volume."

Then new portion of regeneration solution (the "second regeneration bed volume") was mixed with the resin, and the same procedure was repeated, with hourly separation of regeneration solution from resin, air scouring of resin, and testing of regeneration solution for organic compound content.

The regeneration solutions used were as follows:

Example 11: Aqueous Solution of 10% NaCl and 1% NaOH by Weight

Example 12: Aqueous Solution of 10% NaOH and 1% NaCl by Weight

Dissolved organic compounds were determined using the acidic $KMnO_4$ test. Results were as follows:

TABLE 7

Organic content of regeneration solution (g $O_2$/L of resin), and percent of organic compounds by weight that is removed from the resin, based on the amount loaded onto the resin.

| Example | regen. bed vol. | 1 h (%) | 2 h (%) | 3 h (%) | 4 h (%) |
|---|---|---|---|---|---|
| 11 | first | 0.86 (38%) | 1.15 (51%) | 1.28 (56%) | 1.3 (57%) |
| 11 | second | 0.79 (34%) | 0.89 (39%) | 0.95 (42%) | 0.97 (43%) |
| 12 | first | 0.98 (43%) | 1.10 (49%) | 1.67 (74%) | 1.80 (80%) |
| 12 | second | 0.3 (13%) | 0.35 (16%) | 0.41 (18%) | 0.45 (20%) |

Both regeneration solutions remove all the loaded organic compounds after 8 hours and 2 bed volumes.

Examples 13 and 14

Complex Regeneration Scheme

Loaded Scav1 resin was regenerated using the method of Examples 11 and 12, with the following changes. Resin was exposed to the first regeneration bed volume for 3 hours and exposed to the second regeneration bed volume for 2 hours.

Regeneration solutions were aqueous solutions with solute percent by weight as shown below.

TABLE 8

Regeneration Solutions

| Example | first regen. bed vol. | second regen. bed vol. |
|---|---|---|
| 13 | 10% NaOH + 1% NaCl | 10% NaCl + 1% NaOH |
| 14 | 10% NaCl + 1% NaOH | 10% NaOH + 1% NaCl |

Results were as follows:

TABLE 9

Regeneration Results (Organic content, g $O_2$/L, and weight percent of removed organic compounds)

| Example | first regen. bed vol. | second regen. bed vol. |
|---|---|---|
| 13 | 1.77 (67%) | 0.88 (33%) |
| 14 | 1.16 (44%) | 1.16 (44%) |

Example 13 and Example 14 both remove significant amounts of organic content from the resin. Example 13 is more effective, removing all of the organic content from the resin.

The invention claimed is:

1. A method of purifying water comprising
    (a) providing an aqueous solution (A) that has pH of 5.5 or lower and that comprises
        (i) one or more dissolved organic compounds in an amount of 1 mg/L or more, measured as dissolved organic carbon, and
        (ii) 95% or more water by weight based on the weight of the aqueous solution (A), and
    (b) bringing the aqueous solution (A) into contact with a collection of particles of acrylic resin (B) that has calculated Hansch parameter of −0.4 to 1.0, and
    (c) then separating an aqueous solution (C) from the collection of particles of acrylic resin (B).

2. The process of claim 1, wherein the dissolved organic compounds comprise one or more humic acid, one or more fulvic acid, or a mixture thereof.

3. The process of claim 1, wherein the amount of said dissolved organic compounds is 10 mg/L or more, measured as dissolved organic carbon.

4. The process of claim 1, wherein said acrylic resin (B) comprises pendent groups that comprise functional groups selected from primary, secondary, and tertiary amine groups.

5. The process of claim 1, wherein the process further comprises the steps, prior to step (a), of
    (x) providing an aqueous solution (X) that comprises
        (i) 5 mg/L or more of one or more dissolved humic acids, and
        (ii) 95% or more water by weight based on the weight of the aqueous solution (X), and
    (y) bringing the aqueous solution (X) into contact with a collection of particles of resin (Y), wherein the resin (Y) comprises pendant chemical groups selected from the group consisting of sulfonate groups, carboxylate groups, and combinations thereof, and
    (z) then separating the aqueous solution (A) from the collection of particles of acrylic resin (B).

6. The process of claim 1, wherein the process wherein the process further comprises the steps, after step (c), of
    (d) bringing the aqueous solution (C) into contact with a collection of particles of resin (D), wherein the resin (D) comprises quaternary amine pendant chemical groups, and
    (e) then separating an aqueous solution (E) from the collection of particles of resin (D).

7. The process of claim 6, wherein the process further comprises, after step (e), the step of regenerating said acrylic resin (B), wherein said step of regenerating said acrylic resin (B) comprises the steps of
    (f) bringing said collection of particles of acrylic resin (B) into contact with an aqueous solution (RB) having pH of 10 or higher, to form a mixture B2RB,
    (g) then separating acrylic resin (B4) from said mixture B2RB.

8. The process of claim 1 in which acrylic resin (B) has calculated Hansch parameter of −0.4 to 0.5.

* * * * *